US010657605B2

United States Patent
Fenn et al.

(10) Patent No.: US 10,657,605 B2
(45) Date of Patent: May 19, 2020

(54) METHOD FOR CONTROLLING AN ACCOUNTING PROCESS FOR FINANCIAL INSTRUMENTS

(71) Applicant: SAP SE, Walldorf (DE)

(72) Inventors: Markus Fenn, Mannheim (DE);
Mathias Vahle, Mannheim (DE);
Lothar Muessler, Rauenberg (DE);
Matthias Schauer, Rauenberg (DE);
Frank Andreas Raebiger, Bammental (DE)

(73) Assignee: SAP SE, Walldorf (DE)

( * ) Notice: Subject to any disclaimer, the term of this patent is extended or adjusted under 35 U.S.C. 154(b) by 520 days.

(21) Appl. No.: 15/359,580

(22) Filed: Nov. 22, 2016

(65) Prior Publication Data

US 2018/0144411 A1    May 24, 2018

(51) Int. Cl.
*G06Q 40/00* (2012.01)
(52) U.S. Cl.
CPC .................... *G06Q 40/12* (2013.12)
(58) Field of Classification Search
CPC ........................................ G06Q 40/12
USPC .......................................... 705/30
See application file for complete search history.

(56) References Cited

U.S. PATENT DOCUMENTS

| 2005/0246250 A1* | 11/2005 | Murray | G06Q 30/04 |
| | | | 705/30 |
| 2007/0198354 A1* | 8/2007 | Senghore | B01J 23/6562 |
| | | | 705/14.32 |
| 2014/0258053 A1 | 9/2014 | Lange et al. | |
| 2015/0363890 A1* | 12/2015 | Butters | G06Q 40/12 |
| | | | 705/30 |

* cited by examiner

*Primary Examiner* — Russell S Glass
(74) *Attorney, Agent, or Firm* — Klarquist Sparkman, LLP

(57) ABSTRACT

Described herein is a framework for controlling an accounting process for financial instruments. In accordance with one aspect of the framework, information associated with a financial instrument is received. Receiving the information includes creating a corresponding entry in a worklist. The received information is registered. A work package of relevant accounting steps is derived based on the registered information. A plurality of dates having an open status is determined. The dates indicate when the relevant accounting steps are to be executed. The relevant accounting steps are executed according to the determined dates.

20 Claims, 6 Drawing Sheets

US 10,657,605 B2

METHOD FOR CONTROLLING AN ACCOUNTING PROCESS FOR FINANCIAL INSTRUMENTS

TECHNICAL FIELD

The present disclosure relates generally to computer systems, and more specifically, to a framework for controlling an accounting process for financial instruments process.

Financial instruments may include stocks, floating securities, fixed interest bonds and other tradable assets. The financial instruments represent a financial asset for one business party and a financial liability or equity for another business party. Proper accounting of financial instruments, which includes recording information of each party's financial positions, allows each party to recognize the value of its existing financial instruments. Such information is vital for the parties in making effective economic decisions for their businesses.

However, increasing regulatory requirements and shorter reporting cycles impose high demands on accounting solutions of the financial instruments. Furthermore, lower operating margins also result in higher cost pressure for the accounting solution. In view of the challenges, it is important to provide a cost effective accounting process for finding the right balance between meeting the high demands and achieving lower total cost of ownership (TCO).

Therefore, it is desirable to provide an efficient method for controlling an accounting process for financial instruments which can be adapted universally for various financial standards.

SUMMARY

A framework for controlling an accounting process for financial instruments is described herein. In accordance with one aspect of the framework, information associated with a financial instrument is received. Receiving the information includes creating a corresponding entry in a worklist. The received information is registered. A work package of relevant accounting steps is derived based on the registered information. A plurality of dates having an open status is determined. The dates indicate when the relevant accounting steps are to be executed. The relevant accounting steps are executed according to the determined dates.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for controlling an accounting process for financial instruments is described herein. In accordance with one aspect, the present framework provides a single point of decision making that improves the traceability of the financial instruments for users, preventing inconsistent behaviour. In particular, interdependencies between different accounting steps are managed centrally by a central control unit (i.e., a process controller), hence conflicts can effectively be managed. The process controller allows for uniform and consistent control mechanisms which increases comprehensibility of behavior. The intrinsic rule set governing the process controller clearly defines the executing sequences and responsibilities for each accounting step of the accounting process, effectively eliminating encumber steps having various control mechanisms. The elimination of encumber steps allows for speeding up the accounting process, lowering the TCO. In addition, the process controller handles the status transitions of business transactions, allowing an adequate reaction on events to be documented during the accounting process. The status transactions include, for example, updating document of single contract with old status value and reclassifying document (e.g., de-recognition with old status value and recognition with new status value). In the case of changes in valuation, document delta is compared to the old status value. Furthermore, separation of the accounting documentation and the process control improves the stability of processing.

It should be appreciated that the framework described herein may be implemented as a method, a computer-controlled apparatus, a computer process, a computing system, or as an article of manufacture such as a computer-usable medium. These and various other features and advantages will be apparent from the following description.

Figure 1:
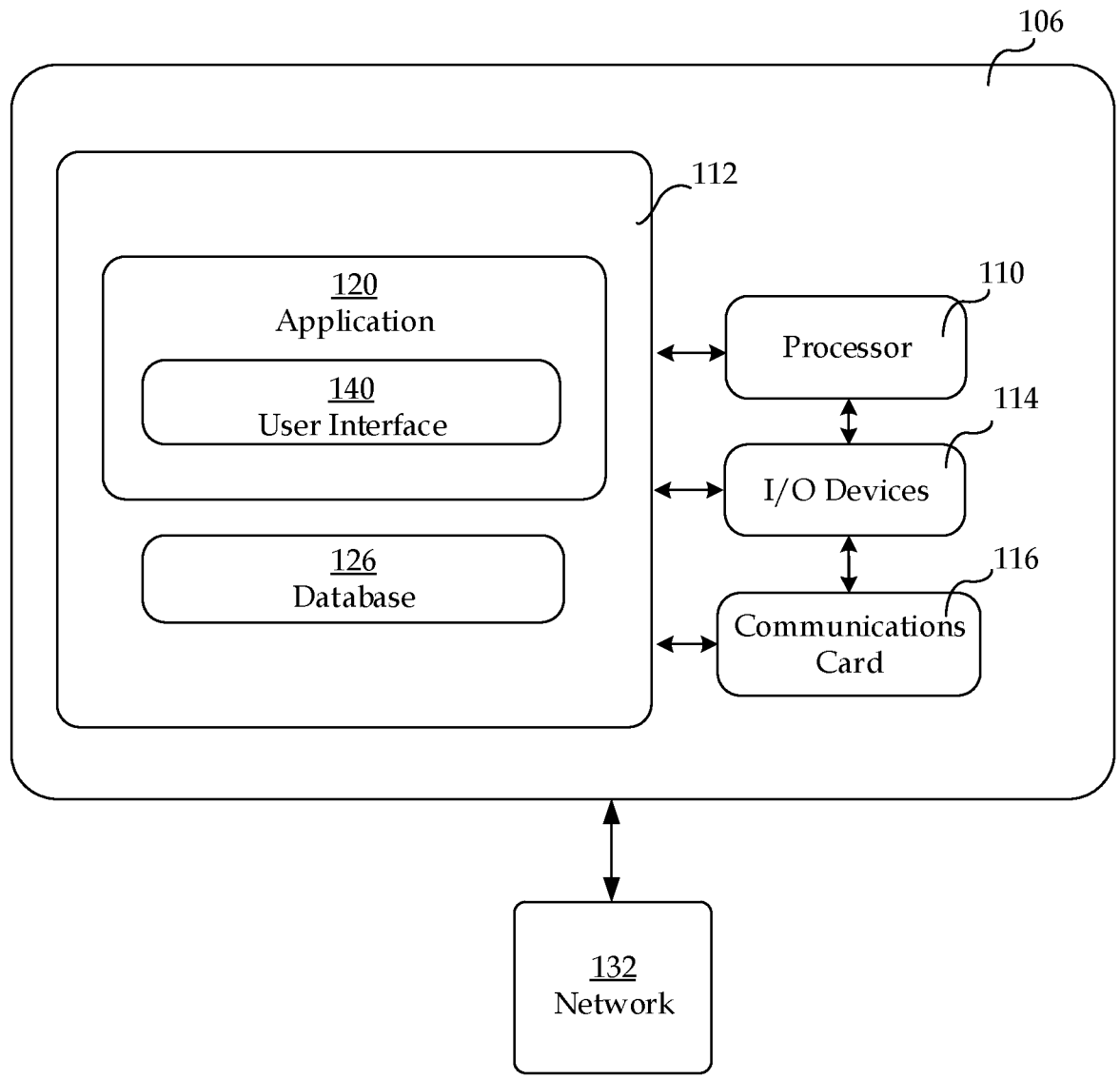
FIG. 1 is a block diagram illustrating an exemplary system.

FIG. 1 is a block diagram illustrating an exemplary system 100 in accordance with one aspect of the present framework. Generally, the exemplary system 100 may include a computer system 106.

Computer system 106 is capable of responding to and executing computer-readable instructions in a defined manner. Computer system 106 may include a processor 110, input/output (I/O) devices 114 (e.g., touch screen, keypad, touch pad, display screen, speaker, etc.), a memory module 112, and a communications card or device 116 (e.g., modem and/or network adapter) for exchanging data with a network 132 (e.g., local area network or LAN, wide area network (WAN), Internet, etc.). It should be appreciated that the different components and sub-components of computer device 106 may be located or executed on different machines or systems. For example, a component may be executed on many computer systems connected via the network at the same time (i.e., cloud computing).

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, computer device 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

The memory module 112 includes an application 120 and a database 126. The application 120 is any software framework that enables the implementation of a method for controlling an accounting process described herein. The application 120 may reference (or process) data stored in the database 126. In some implementations, the application 120 can be and/or include a web browser. In addition, the application 120 may include a user interface 140 that enables a user to access the application 120. In one embodiment, the user interface 140 includes a graphical user interface (GUI). A GUI may provide an efficient and user-friendly manner of presenting information or communicating with the computer system. For example, a GUI may include a task menu as well as one or more panels for displaying information.

Database 126 is an organized collection of data, such as tables, queries, reports, views, and other objects. Database 126 may also include a database management system (DBMS), which is a system software for creating and managing databases 126. The DBMS provides users and programmers with a systematic way to create, retrieve, update and manage data. Database 126 may be based on a relational model, such as SAP HANA, Oracle Database, Microsoft SQL Server, MySQL, IBM DB2, IBM Informix, and so forth. Other types of database technology may also be used.

Computer system 106 may be communicatively coupled to one or more computer systems (not shown) via network 132. For example, computer system 106 may operate in a networked environment using logical connections to one or more remote computers (not shown). The remote computer may be another personal computer, a server, a router, a network PC, a peer device or other common network node, and typically includes many or all of the elements described above relative to computer system 106. Network 132 may be a local area network (LAN) or a wide area network (WAN).

Figure 2:
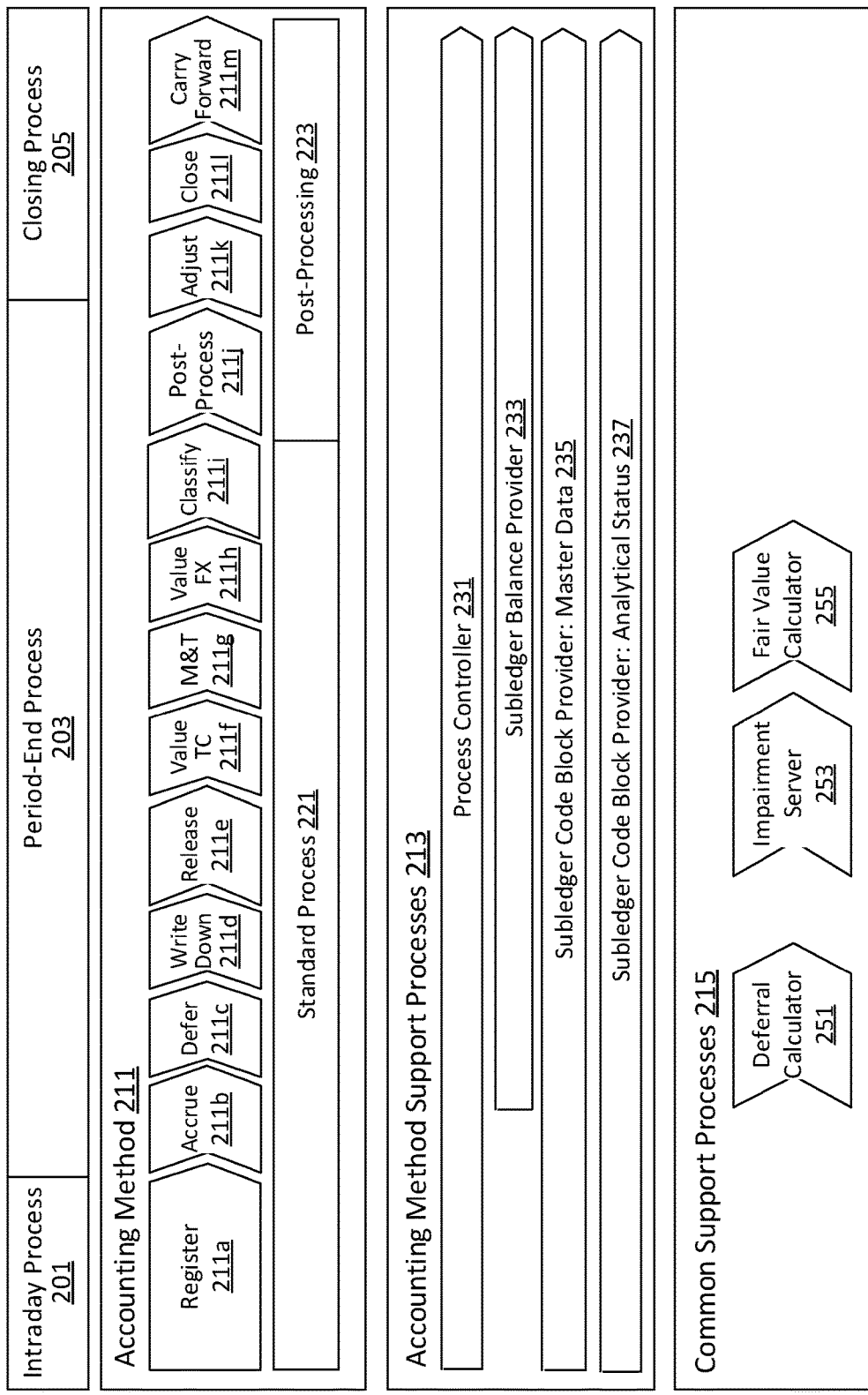
FIG. 2 shows an exemplary subsidiary ledger (subledger) accounting process.

FIG. 2 shows an exemplary subsidiary ledger (subledger) accounting process 200. A subledger is a summary containing all of a detailed sub-set of financial instruments transactions. The detailed sub-set may include the transaction dates of the financial instruments, description of the financial instruments, and amounts billed, paid or received. The subledger, in one implementation, is stored in the database 126. In one implementation, the subledger accounting process may be a single contract-based subledger accounting process. The subledger accounting process 200 may be divided into three main processes. The three main processes include an intraday process 201, a period-end process (or day-end process) 203 and a closing process 205. Each of the main processes is associated with one or more steps of a smart accounting method 211, as shown in FIG. 2.

The intraday process 201 may include the step of register 211a which may be scheduled to run once or multiple times during the day. The register step typically is concluded within the day. The register step 211a may receive operational information and record quantity changes (e.g., unpaid principal balance). The register step may be performed before the other accounting steps to keep the accounting application simple and tractable. The register step may include sub-steps for registering the business transactions, business partner and master data changes (e.g., contractual changes), and credit events (e.g., analytical events). The business transaction may be a customer payment or information on a contractually due payment, a so-called settlement business transaction. Master data changes may include a contractual change (e.g., restructuring of the contractual payment) or a change in business partner attributes (e.g., a change of the place of residence from "domestic" to "foreign"). Credit events may include an indicator of financial distress, such as a deterioration of the credit rating or the fact that a certain critical dunning level has been reached.

The period-end process (or day-end process) 203 is responsible for updating all financial positions of all contracts in order to produce a current balance sheet reporting. A financial position is the financial instruments (e.g., cash, securities, commodities) held and/or owned by a person or legal entity. The period-end process 203, for example, updates summary records for the current period and it may be scheduled to perform once a day during a period or once at the end of a period. On the other hand, instead of periodically updating the whole portfolio, the day-end process is an event-triggered process for single contracts. The period-end (or day-end) process may include the steps of accrue 211b, defer 211c, write down 211d, release 211e, value transaction currency (TC) 211f, move and transform (M&T) 211g, value foreign exchange (FX) 211h, classify 211i, and post-process 211j. The steps may be performed in a sequence after the register step 211a. The accrue step 211b may include calculating the interest accruals associated with financial positions. A financial position may be a financial product that is part of a financial account (e.g., securities account) or any financial contract (e.g., loan, current account). The defer step 211c may include calculating the discount deferral or the periodic charges associated with the financial positions. The write down step 211d documents or records notional write-downs. For example, in the case of high risk of default, the unpaid principal balance (UPB) is reduced or written down for balance sheet reporting without reducing the receivable against the customer. The release step 211e may include releasing valuation remnants to the profit and loss or corresponding reserves. The value TC step 211f updates the value of a financial position in transaction currency. The M&T step 211g is responsible for fixing the foreign currency rate. The value FX step 211h determines the foreign currency gains and losses. The classify step 211i may include determining the relevant disclosure of a position in the financial statements by representing the information created in the one or more preceding steps. The post-processing step 211j is used for a second valuation of the financial instrument after a change of characteristic that leads to a change of the valuation method.

The closing process 205 may include the steps of adjust 211k, close 211l and carry forward 211m. The adjust step 211k posts manual corrections. The close step 211l marks the end of the posting period, i.e., no more postings in the current period are possible. The carry forward step 211m carries forward the balances of the fiscal year end as opening balances for the next fiscal year. The steps may be performed in a sequence after the period-end process 203.

In one implementation, the steps from register to classify form a standard process 221 of the subledger accounting process, whereas the steps commencing from the steps of post-process form a post-processing process 223 of the subledger accounting process.

The subledger accounting process 200 may include support processes 213 for the accounting method 211. The accounting method support processes may include a plurality of processes, such as processes carried out by a process controller 231, a subledger balance provider (SBP) 233, a subledger code block provider (master data) 235 and a subledger code block provider (analytical status) 237. The functions of each of the support processes will be described in more detail with reference to an exemplary smart accounting architecture.

In one implementation, the support processes 213 may be performed in parallel with one or more of the steps (i.e., step 211a to step 211m) of the accounting method 211. In another implementation, the support processes 213 may be performed before or after steps 211a to 211h of the accounting method 211. The classify step 211i may be performed based on the information provided by the steps 211a to 211h and/or the support processes 213.

The subledger accounting process 200 may also include common support processes 215 for the accounting method 211. The common support processes 215 may include common calculators such as a deferral calculator 251, an impairment server 253 and a fair value calculator 255. The deferral calculator 251, for example, calculates new principle after deferring a loan for a defined period of time. The impairment server 253 determines the write down, risk provision (after write-down) and unwinding for individual contracts. The fair value calculator 255 calculates the fair value of a stock share or equity option.

Figure 3:
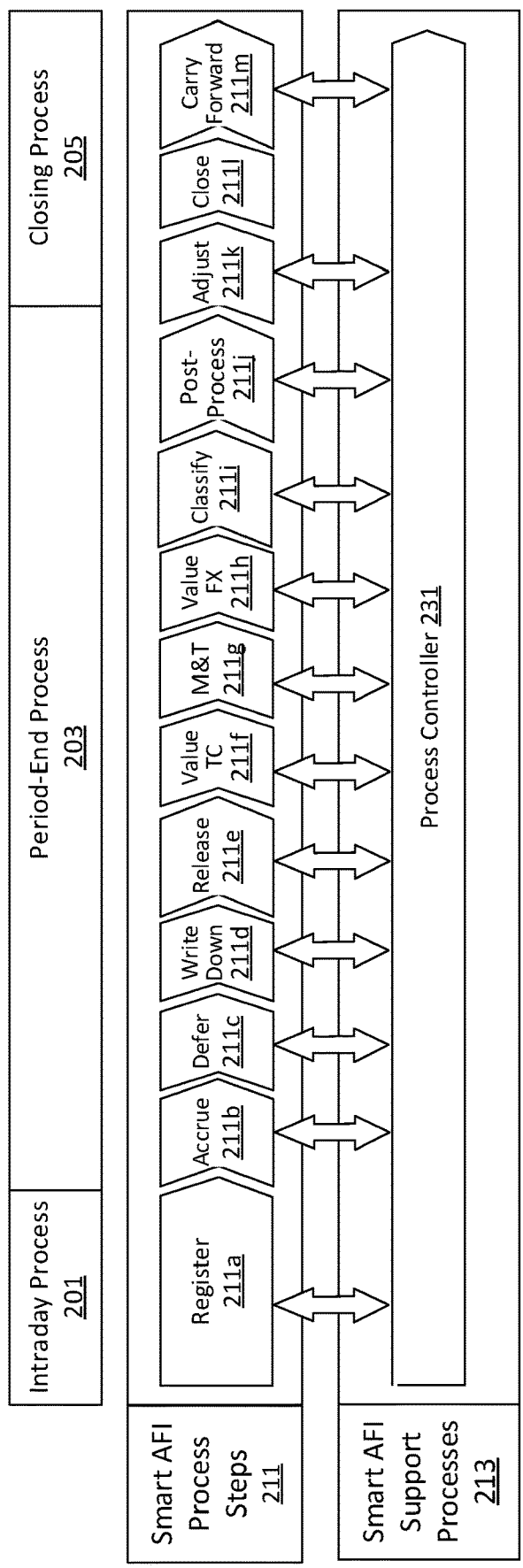
FIG. 3 shows an exemplary interaction of an accounting method with a process controller of a subledger accounting process.

FIG. 3 shows an exemplary interaction 300 of the accounting method 211 with the process controller 231 of the subsidiary ledger (subledger) accounting process 200 as shown in FIG. 2. The process controller 231 acts as the central control unit of the subledger accounting process 200.

As shown, the process controller 231 interacts with each accounting step (i.e., steps 211a to 211k and 211m) to provide accounting solutions. The process controller 231 interacts with each accounting step, for example, by providing a worklist to the accounting step, informing about contract-related processing and receiving status information. A worklist, for example, may be created by a client for updating a business transaction.

The process controller 231 is a single point of entry for any accounting relevant information. For example, the process controller clearly defines the executing sequences and responsibilities for each accounting step of the single contract-based subledger accounting process, effectively eliminating encumber steps having various control mechanisms. The elimination of encumber steps speeds up the accounting process, lowering the TCO.

The process controller 231 may act as a dispatcher of information to the accounting steps by providing dedicated worklists to all of the accounting steps. The information may be dispatched according to the intrinsic rule sets of the period-end process based on operational events and analytical business decisions. The information may also be dispatched periodically according to schedules for the whole portfolio based on the rule sets. For deterministic processing, the information is dispatched based on a rule set for the period-end process. As for event-driving processing, the information is dispatched based on a single contract level in response to master data changes and analytical decisions for the day-end processing. For error reprocessing, the information is dispatched based on a single contract level for positions which cause errors. A single contract level refers to each financial position of a financial instrument.

The process controller 231 may also act as a monitoring instance and memory after closing the period. For example, the process controller provides status handling and process documentation on a single contract level and as per process step. The process controller also provides status handling and process documentation as per business date for business transaction, master data changes, analytical decision and process run.

Figure 4:
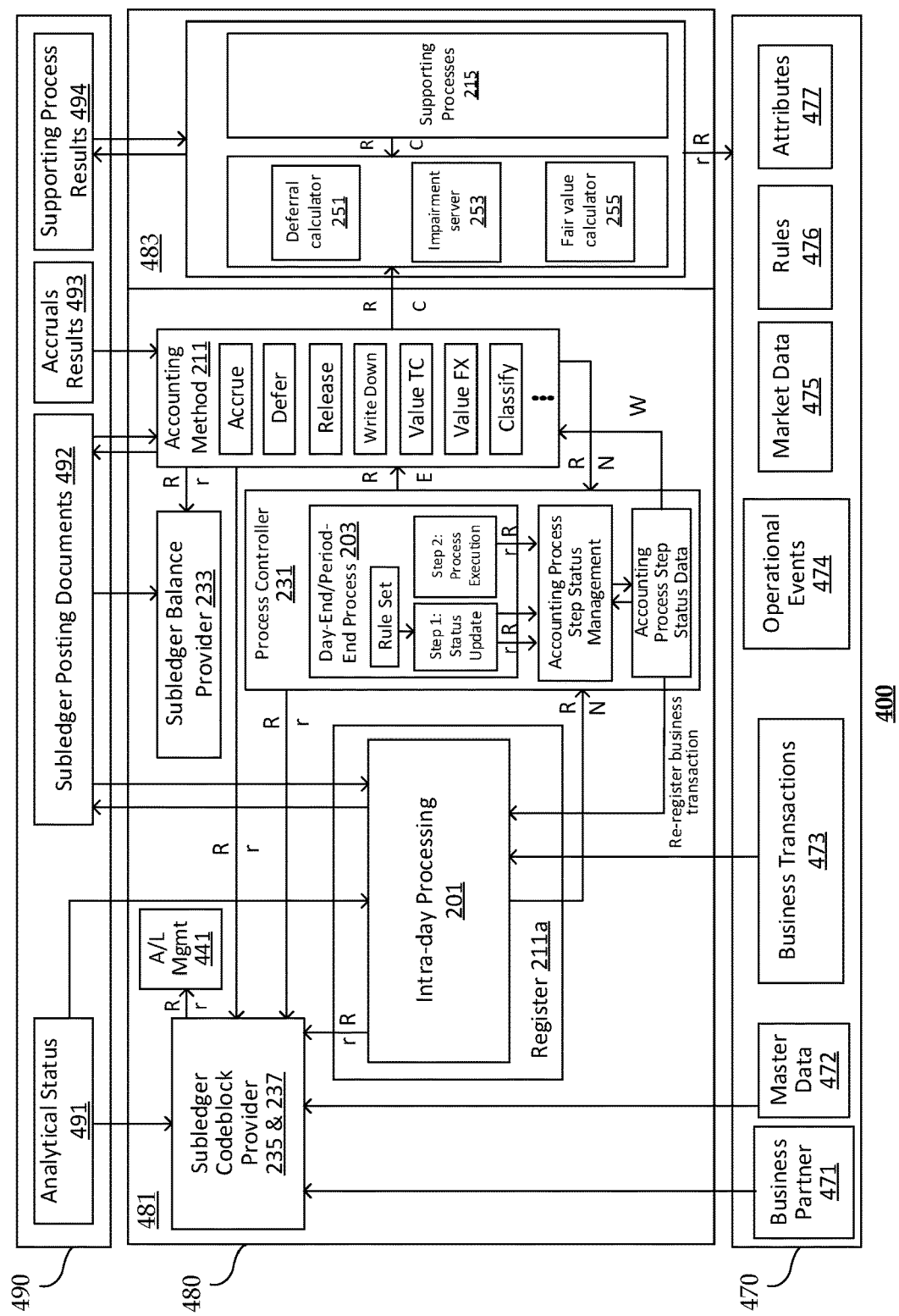
FIG. 4 shows an exemplary smart accounting architecture for implementing a subledger accounting process.

FIG. 4 shows an exemplary smart accounting architecture 400 for implementing the subledger accounting process. The architecture 400 includes a plurality of layers/interfaces, including a reference data/source data layer (SDL) 470, a process and method layer (PML) 480 and a result data layer (RDL) 490. It should be noted that in the following discussion, reference will be made, using like numerals, to the features described in FIGS. 1-3.

The SDL 470 is an interface which provides retrieval of reference and source data (e.g., business transaction data) to be used for the accounting of one or more financial instruments. A financial instrument can be a consumer or mortgage loan contract, a current account contract, a deposit account contract, a bond and others. In one implementation, the reference and source data are normative objects representing the business operations. The data, for example, may include data associated with the one or more financial instruments, such as business partners 471, contract and instrument master data 472, business transaction flow data 473, operational events 474, market data 475, accounting rules 476 and specific attribute values 477. The SDL stores the data on the database 126 until the data is requested by the processor 110 for executing the sub-ledger accounting method. The data which are persisted in the database may include the originally created data and the revised or updated data. For example, revised versions of the originally created data are stored as updated versions in the database together with the originally created data, for ease of reference or comparison. Keeping older versions (i.e., original and earlier revised versions) of the data may allow for processing corrections which may be needed at a later date. For example, the corresponding version of the master data is needed when processing a correction for a business transaction having an older posting date.

The RDL 490 is an interface for storing, displaying and editing result data. The results data may be presented to the user in the form of subledger documents. The documents, for example, includes analytical status documents 491 and various types of accounting result documents. The analytical status documents 491 may include records of customer-specific characteristics, such as holding categories, impairment attributes and others. The accounting result documents may include subledger posting documents 492, statements of accruals results 493 and supporting process results 494. The subledger posting results 492 may include balance, book value and sub-book value of the accounting steps (i.e., steps 211b to 211i). The accruals results 493 may include the revenues and expenses incurred from various accounting steps of the financial instruments which measures a company's profitability within a pre-defined period. Examples of the various accounting steps may include accrue, defer, release, write down, value TC, value FX and classify as described in FIG. 2. The accounting steps are performed by retrieving the relevant financial instruments associated data stored in the database via the SDL 470. The supporting process results 494 may include analytical results of fair values and impairments, such as an impairment expected loss determination for an individual financial instrument. Data associated with the individual financial instrument, such as accounting rules and specific attribute values, are retrieved via the SDL 470 for analyzing the fair values and impairments.

In one implementation, the result data is stored in the RDL 490 in the form of result types. When the result data is edited, corrected or changed, a new version of the result data is automatically created and stored in the RDL. The versions of the result data that already exist cannot be overwritten. Having different versions of the result data enables the user to view specific versions and compare different versions. Contrary to the SDL 470 which stores the reference and source data, the RDL 490 stores data that has been completely valuated in the PML.

The RDL 490 may include a user interface, such as a graphical user interface (GUI). The GUI provides the user a visual representation of software programs or applications on the screen. The GUI also provides the user a visual representation of the result data within a result view. For example, if several result types are available, related result data can be aggregated and assigned to the result view for the convenience of the user.

The PML 480 includes two major components. The first major component 481 includes the accounting method 211 and accounting method support processes 213, whereas the second major component 483 includes the common support processes 215.

One of the accounting method support processes, namely the subledger balance provider (SBP) 233 provides the output of the accounting steps (i.e., steps 211b to 211i) such as balance, book value and sub-book value to the RDL 490 to be published as the subledger posting documents.

Other accounting method support processes, such as the subledger codeblock provider (SCP) 235 and 237 reads the reference data (e.g., business partner and master data) from (or to) the SDL 470 and requests the status of asset/liability from an asset/liability management module 441 which resides in the PML 480. In addition, the SCP also reads or writes the analytical status 491 posted in the RDL 490. The SCP also provides relevant information in respond to requests by the process controller, accounting steps and intraday process (i.e., the register step).

The process controller 231, as described with respect to FIG. 3, dispatches information to the accounting steps by providing a dedicated worklist to the accounting steps based on rule sets. For example, the worklist are provided to one or more relevant accounting steps to be executed based on the rule sets. In one implementation, the process controller includes logic for period-end process response and manages the statuses of the accounting steps on the contract level. The process controller provides a worklist to the period-end processing which in turn reads the current status and executes the called accounting steps (e.g., accrual, deferral, release, write-down and etc.). The called accounting steps read and write the posting documents to be stored and published in the RDL 490. During the execution of the accounting steps, the accounting steps call the common support processes 215 to perform calculation using the common calculators such as the deferral calculator 251, impairment server 253 and fair value calculator 255.

Figure 5:
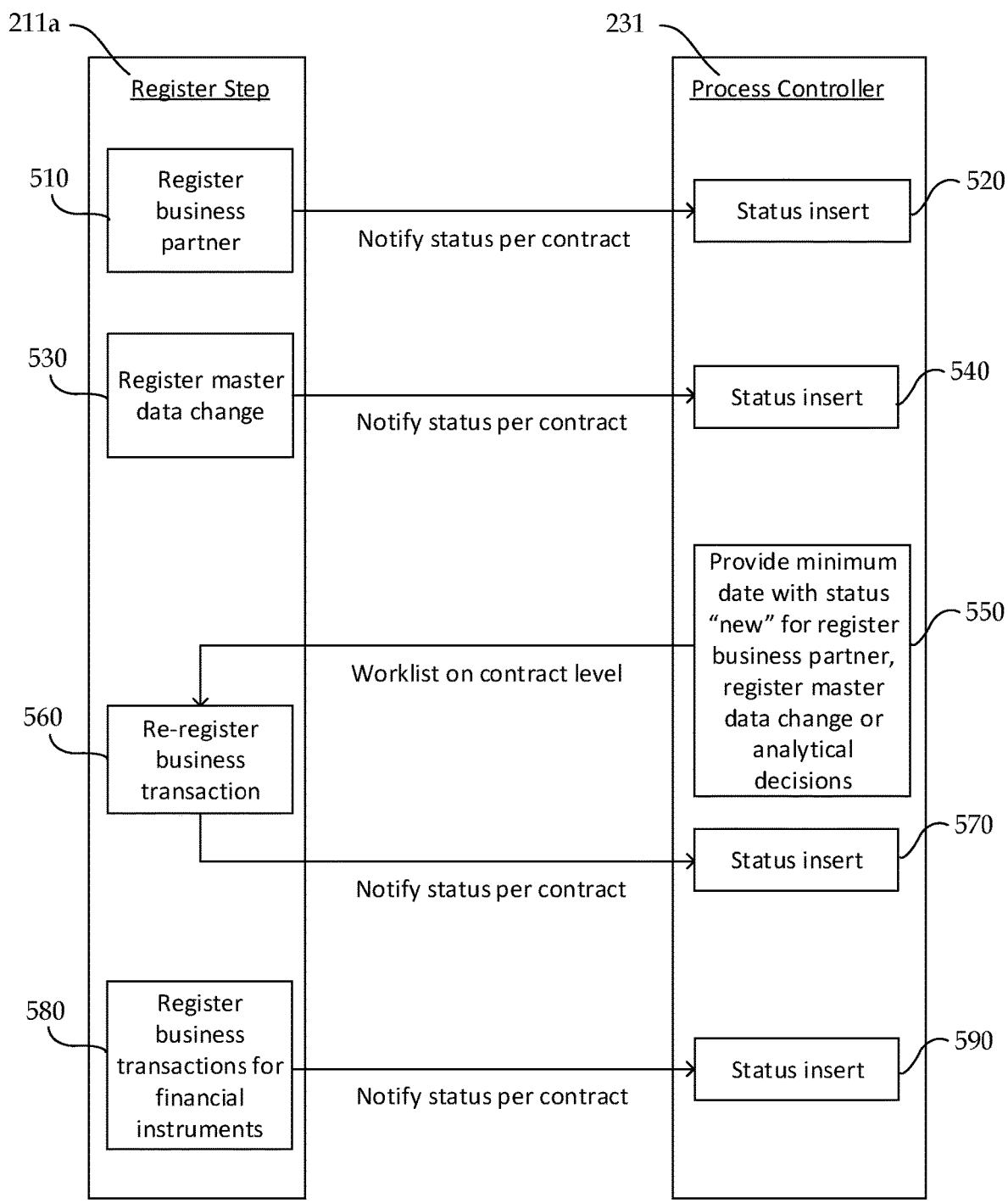
FIG. 5 shows an exemplary method for implementing a registering step of an intraday process.

FIG. 5 shows an exemplary method 500 for implementing the register step 211a of the intraday process 201. It should be noted that in the following discussion, reference will be made, using like numerals, to the features described in FIGS. 1-4.

The register step 211a may include a plurality of sub-steps associated with changes at a contract level, such as register business partner sub-step, register master data change sub-step, re-register business transaction sub-step and register business transactions for financial instruments sub-step.

At 510, delivery of new business partner information by a client triggers the creation of a corresponding entry in a worklist table for the register business partner sub-step. The worklist table, for example, includes a worklist of contracts. The register step 211a processes the entry in the worklist and notifies the process controller 231 of the changes on a single contract level. At 520, upon receiving the notification from the register step 211a, the process controller stores the information about the business partner. The current status of the information, for example, is inserted into a status table persisted in the process controller.

At 530, delivery of new version of master data by a client triggers the creation of a corresponding entry in the worklist table for the register master data change sub-step. The register step 211a processes the entry in the worklist and notifies the process controller 231 of the changes on a single contract level. At 540, upon receiving the notification from the register step 211a, the process controller stores the information about the master data change and insert the current status of the information into the status table.

At 550, the process controller provides the minimum (i.e., earliest) date of new changes as an input in a worklist to the register step 211a. The input, for example, has a status "new". The new changes may either be a change to the business partner, master data or analytical decisions. The new changes may result in discrepancy with the data or information about the master data, business partner or analytical decisions having an older posting date. An example of such changes is a backdated master data change. In one implementation, the delivery of the minimum (i.e., earliest) date of new changes triggers the creation of an entry in the worklist table for the re-register sub-step. The worklist, for example, includes the all the business transactions with a posting date which is later than the date of older changes. At 560, the register step 211a notifies the process controller about the re-register. At 570, upon receiving the notification from the register step, the process controller stores the re-registered information and inserts the current status of the information into the status table.

At 580, the register step 211*a* re-registers all the business transactions in the worklist created in the re-register sub-step. The register step 211*a* processes the entries in the worklist and notifies the process controller 231 of the re-registered information. At 590, the process controller 231 stores the information about the business transactions on a single contract level and inserts the current status of the information into the status table. The status of the posted business transaction, for example, is saved on a contract level.

An example of the register step 211*a* for master data changes is illustrated as follows. Delivery of a new version of master data triggers the creation of a corresponding entry in a worklist table for the register step (i.e., register master data change sub-step). The register step processes the entry and notifies the process controller about the change (i.e., the new version of master data). The process controller stores the information about the master data change in its status table. In one implementation, the process controller may provide the minimum (i.e., the earliest) date of the new master data (i.e., changes made to an existing master data) to the register step (i.e., re-register business transaction sub-step). The register step selects all already posted business transactions with a later posting date for re-registering. In one implementation, selecting the all already posted business transaction includes reading the corresponding posting documents of the registered business transactions. For example, if the master data is incorrect during the business transaction registration, the corresponding posting document would have to be re-created as soon as the correct master data is delivered. That is, only those business transactions which have had the posting documents created and the posting date which is later than the date of the older master data change are selected. Subsequently, the register step (i.e., register business transactions for financial instruments sub-step) re-registers the information (i.e., master data) of all the selected business transactions and duly informs the process controller about the successful re-registration. In one implementation, re-registering the information of all the selected business transactions includes creating corresponding entries in the worklist. The process controller proceeds to store and insert a current status of the changes in a status table.

The status information inserted in the status table is subsequently used to derive specific consequences that are necessary to execute the steps of the day-end (or period-end) process which will be described in the following section.

Figure 6:
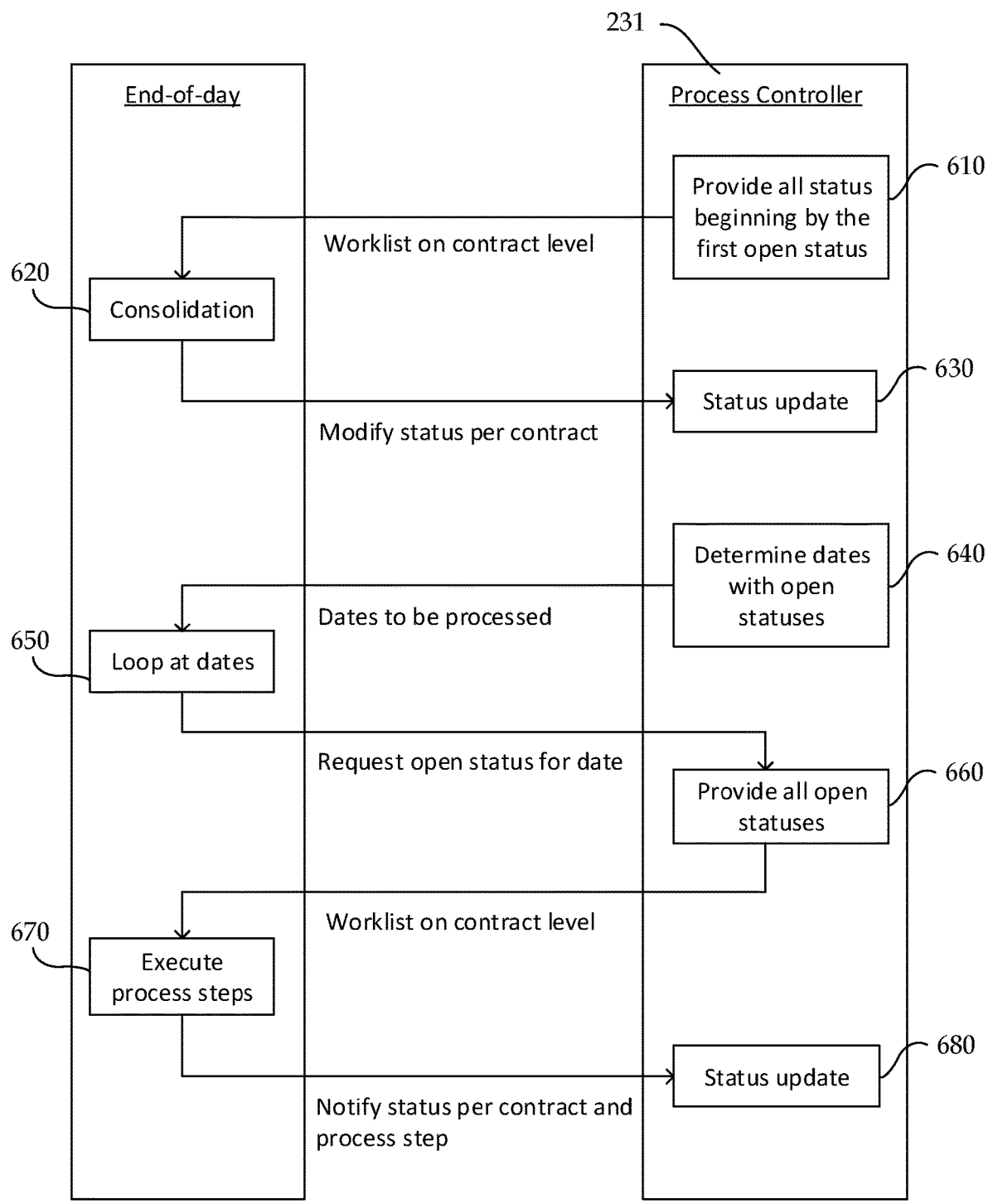
FIG. 6 shows an exemplary method for implementing a day-end process.

FIG. 6 shows an exemplary method 600 for implementing the day-end process. The method, in one implementation, includes a consolidation phase and an execution phase. For example, in the consolidation phase of the day-end processing, the information of the register step 211*a* and previous day-end and/or period-end executions are used to derive the relevant accounting steps (i.e., steps 211*b*-211*i*) and their status to be executed in the execution phase. It should be noted that in the following discussion, reference will be made, using like numerals, to the features described in FIGS. 1-5.

At 610, the process controller 231 selects all the successfully registered changes, including business partner, master data change and business transactions, which have been completed in the register step as described with reference to FIG. 5. The process controller creates and provides a worklist of contracts based on the selected registered changes to the day-end process. For example, all the open status in the status table which persisted in the process controller are provided in the worklist beginning with the first open status. The registered changes, for example, may include new information (e.g., business partner, master data and business transactions) or an unsuccessful previous processing (e.g., day-end or period-end process).

At 620, based on the each of the contracts in the worklist, the day-end process derives and consolidates a list of consequences based on a given rule set. The consolidated list of consequences is used to tie up suitable work packages for the relevant accounting steps (e.g., accrue, deferral and etc.) to be executed. For example, new status "to be executed" is created for the relevant accounting steps, and the existing status of the accounting steps with a higher (or later) posting date are set to "roll-up".

At 630, upon receiving the consolidated list of consequence from the day-end process, the process controller stores the information and inserts the current status of the information in the status table as either "to be executed" or "roll-up". Other statuses may also be useful.

At 640, the execution phase starts by determining the dates with open statuses, such as "to be executed" and "roll-up". The dates indicate the dates when the relevant accounting steps are to be triggered and executed to create posting documents. The process controller provides the determined dates to the day-end process.

At 650, an iteration or loop over is identified for all dates with an open status, starting from the date of the registered changes. A loop over of the open dates (i.e., loop-at date), for example, is executed for the relevant contracts. An open status request for the loop-at date is sent to the process controller for further processing.

At 660, the process controller provides the worklist of contracts with open status to the day-end process for each open date. For example, the open statuses are provided to the day-end process on their loop-at dates.

At 670, at the loop-at dates, the relevant accounting steps are triggered and the day-end process executes the relevant accounting steps in accordance to the worklist given by the respective open status in the status table of the process controller. The execution of the accounting steps may include calling the common support processes 215 to perform calculation using the common calculators such as the deferral calculator 251, impairment server 253 and fair value calculator 255. Upon successful execution of each of the accounting steps at the contract level, the day-end process notifies the process controller about the status of each contract.

At 680, upon receiving the response from day-end process, the process controller stores the information about the completion of execution and inserts the current status of the information in the status table. For example, the process controller stores and inserts the current status of each of the executed accounting step.

The completion of the execution of each accounting step, for example, are stored in the form of subledger documents, such as subledger posting results, statements of accruals results and supporting process results in the RDL.

In one implementation, the method 600 for implementing the day-end process may also be applied to the period-end process which updates all positions for all contracts in order to get a current balance sheet reporting. For example, the method includes deriving accounting steps to be executed in the consolidation phase, building work packages and triggering the relevant accounting steps in a defined sequence in the execution phase. The trigger for the accounting steps in the period-end process, for example, is either registered changes (i.e., business partner or master data) on single financial instrument positions or it's given periodically by a rule set for the whole portfolio. In addition, while the day-end process executes the relevant accounting steps at the loop over of the open dates for the relevant contracts, the period-end process executes the relevant accounting step at the given period-end dates (i.e., scheduled dates).

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method for controlling an accounting process for financial instruments:
   receiving information associated with a financial instrument, wherein receiving the information comprises creating a corresponding entry in a worklist in a database;
   registering the received information in the database;
   deriving a work package of relevant accounting steps based on the registered information;
   determining a plurality of dates having an open-type status, wherein the dates indicate when the relevant accounting steps are to be executed, wherein determining the plurality of dates having an open-type status comprises determining all open-type statuses beginning with a first open-type status, and wherein the open-type statuses comprise a "to be executed" status or a "roll-up" status; and
   triggering execution of the relevant accounting steps according to the determined dates having an open-type status, wherein execution of the relevant accounting steps comprises:
      retrieving the registered information and the associated financial instrument from the database;
      receiving the worklist entry;
      performing the work package to generate execution result data; and
      storing the execution result data in the database.

2. The method of claim 1 wherein the information comprises information about business partner, master data, business transaction or a combination thereof.

3. The method of claim 1 wherein registering the received information comprises:
   processing the entry corresponding to the received information in the worklist; and
   inserting a current status of the received information in a status table.

4. The method of claim 1 wherein registering the received information comprises:
   receiving a earliest date of a new change to the received information;
   re-registering the new change to the received information; and
   inserting a current status of the received information in a status table.

5. The method of claim 4 wherein re-registering the new change comprises:
   creating a corresponding entry in the worklist; and
   selecting posted business transactions associated with the received information for re-registering.

6. The method of claim 5 wherein the selected posted business transactions comprise posting documents and a posting date of the posting documents which is later than the date of older changes.

7. The method of claim 6 wherein selecting the posted business transactions comprises reading the corresponding posting documents of the registered business transactions.

8. The method of claim 1 wherein relevant accounting steps comprise accrue, defer, write-down, release, value transaction currency (TC), move and transform (M&T), value foreign currency (FX), classify or a combination thereof.

9. The method of claim 1 wherein deriving a work package of relevant accounting steps is based on a predefined rule set.

10. The method of claim 1 wherein determining the plurality of dates having an open status comprises identifying a loop-at date for the plurality of dates with an open status.

11. The method of claim 10 wherein executing the relevant accounting steps comprises executing the relevant accounting steps at the loop-at date.

12. The method of claim 1 wherein executing the relevant accounting steps creates posting documents associated with financial instruments.

13. A system for controlling an accounting process for financial instruments comprising:
   a non-transitory computer-readable medium for storing a database and computer-readable program code; and
   one or more processors in communication with the non-transitory computer-readable medium, the one or more processors being operative with the computer-readable program code to perform operations including:
      providing a central control unit, wherein the central control unit comprises a rule set, the rule set defines executing sequences of a plurality of accounting steps;
      receiving information associated with a financial instrument, wherein receiving the information comprises creating a corresponding entry in a worklist table in a database;
      registering the received information in the database;
      deriving, by the central control unit, a work package of relevant accounting steps based on the registered information and the rule set;
      determining, by the central control unit, a plurality of dates having an open-type status, wherein the dates indicate when the relevant accounting steps having the open-type status are to be executed, and wherein determining the plurality of dates having an open-type status comprises identifying one or more open-type statuses and determining dates having at least one of the identified one or more open-type statuses for the respective identified open-type statuses;
      identifying, by the central control unit, one or more loop over dates for the respective plurality of dates having at least one of the identified open-type statuses; and
      triggering execution of the relevant accounting steps according to the identified loop over dates, wherein execution of the relevant accounting steps comprises:
         retrieving the registered information and the associated financial instrument from the database;
         receiving the worklist entry;
         performing the work package to generate execution result data;
         storing execution result data in the database.

14. The system of claim 13 wherein registering the received information comprises:

processing the entry corresponding to the received information in the worklist; and inserting, by the process controller, a current status of the received information in a status table.

15. The system of claim 13 wherein registering the received information comprises:

receiving an earliest date of a new change to the received information;

re-registering the new change to the received information; and inserting, by the process controller, a current status of the received information in a status table.

16. The system of claim 15 wherein re-registering the new change comprises:

creating a corresponding entry in the worklist; and selecting posted business transactions associated with the received information for re-registering.

17. A non-transitory computer-readable medium having stored thereon program code, the program code executable by a computer to perform steps comprising:

receiving information associated with a financial instrument;

registering the received information in a database, wherein registering the received information comprises creating a corresponding entry in a worklist table in the database;

deriving a work package of relevant accounting steps based on the registered information;

determining a plurality of dates having an open-type status, wherein the dates indicate when the relevant accounting steps having the open-type status are to be executed, and wherein determining the plurality of dates having an open-type status comprises identifying one or more open-type statuses and identifying dates having at least one of the identified one or more open-type statuses iteratively for the respective identified open-type statuses;

identifying, by the central control unit, one or more loop over dates for the respective plurality of dates having at least one of the identified open-type statuses; and triggering execution of the relevant accounting steps according to the identified loop over dates, wherein the relevant accounting steps are triggered in a defined sequence, and wherein execution of the relevant accounting steps comprises:

retrieving the registered information and the associated financial instrument from the database;

receiving the worklist entry;

performing the work package to generate execution result data;

storing execution result data in the database.

18. The method of claim 1, wherein deriving the work package of relevant accounting steps comprises deriving a list of consequences based on a rule set, wherein the list of consequences is associated with the work package.

19. The method of claim 1, wherein execution of the relevant accounting steps further comprises calling a common support process comprising at least one of a deferral calculator, an impairment server, and a fair value calculator.

20. The method of claim 1, wherein the execution is further triggered at least in part by a registered change and/or a portfolio rule set.

* * * * *